US012221936B2

(12) United States Patent
Kobayashi et al.

(10) Patent No.: US 12,221,936 B2
(45) Date of Patent: Feb. 11, 2025

(54) DIESEL ENGINE, DIESEL ENGINE MANUFACTURING METHOD, AND DIESEL ENGINE INJECTION-AMOUNT CORRECTION SYSTEM

(71) Applicant: KUBOTA CORPORATION, Osaka (JP)

(72) Inventors: Yasushi Kobayashi, Sakai (JP); Hiroki Oso, Sakai (JP); Kiichi Suehiro, Sakai (JP); Yuki Tagashira, Sakai (JP); Koji Nakakita, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/565,224

(22) PCT Filed: Feb. 21, 2022

(86) PCT No.: PCT/JP2022/007026
§ 371 (c)(1),
(2) Date: Nov. 29, 2023

(87) PCT Pub. No.: WO2023/026518
PCT Pub. Date: Mar. 2, 2023

(65) Prior Publication Data
US 2024/0254940 A1     Aug. 1, 2024

(30) Foreign Application Priority Data
Aug. 27, 2021   (JP) ................... 2021-139050

(51) Int. Cl.
*F02D 41/40* (2006.01)
*F02D 41/20* (2006.01)

(52) U.S. Cl.
CPC .... *F02D 41/406* (2013.01); *F02D 2041/2058* (2013.01)

(58) Field of Classification Search
CPC ...... F02D 41/20; F02D 41/2467; F02D 41/36; F02D 41/40; F02D 41/406;
(Continued)

(56) References Cited

U.S. PATENT DOCUMENTS

2006/0137661 A1* 6/2006 Hayakawa .............. F02D 41/20
                                                      123/499
2015/0144109 A1* 5/2015 Mukaihara ............. F02D 41/36
                                                      123/490

(Continued)

FOREIGN PATENT DOCUMENTS

EP       1026384 A1    8/2000
JP   2014-005740 A    1/2014

(Continued)

*Primary Examiner* — Logan M Kraft
*Assistant Examiner* — Johnny H Hoang
(74) *Attorney, Agent, or Firm* — Muncy, Geissler, Olds & Lowe, P.C.

(57) ABSTRACT

A diesel engine 30 includes an injector 4 that uses a solenoid to directly drive a needle valve and inject a fuel and an injector control device 2 that controls the driving by the injector 4. The injector control device 2 includes a charge voltage control circuit 22, a storage unit 25 that stores a correction value related to an injection amount of the fuel injected from the injector 4, and an injector control circuit 24 that controls the driving by the injector 4 on the basis of each of a voltage supplied from the charge voltage control circuit 22 and the correction value stored in the storage unit 25. The correction value is set according to a voltage applied to a terminal of the injector control device 2 connected to a load when a current starts to flow in the load connected to the injector control device 2.

11 Claims, 6 Drawing Sheets

(58) Field of Classification Search
CPC ....... F02D 2200/063; F02D 2041/2031; F02D 2041/2034; F02D 2041/2041; F02D 2041/2003; F02D 2041/2058; F02M 51/00; F02M 51/06
See application file for complete search history.

(56) References Cited

U.S. PATENT DOCUMENTS

| | | | |
|---|---|---|---|
| 2016/0215721 A1 | 7/2016 | Nakano | |
| 2016/0298565 A1* | 10/2016 | Nagatomo | F02M 51/061 |
| 2019/0093589 A1* | 3/2019 | Nambu | H02M 3/155 |

FOREIGN PATENT DOCUMENTS

| | | |
|---|---|---|
| JP | 2017-057755 A | 3/2017 |
| JP | 2020-180593 A | 11/2020 |
| JP | 2021-099071 A | 7/2021 |

* cited by examiner

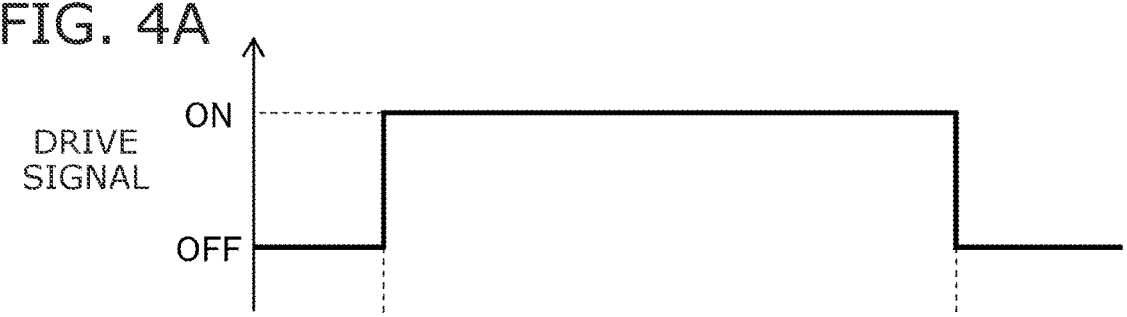
FIG. 4A DRIVE SIGNAL
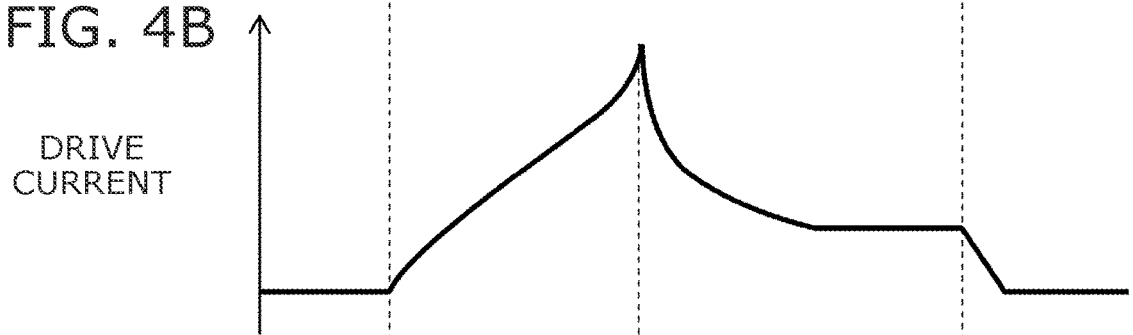
FIG. 4B DRIVE CURRENT
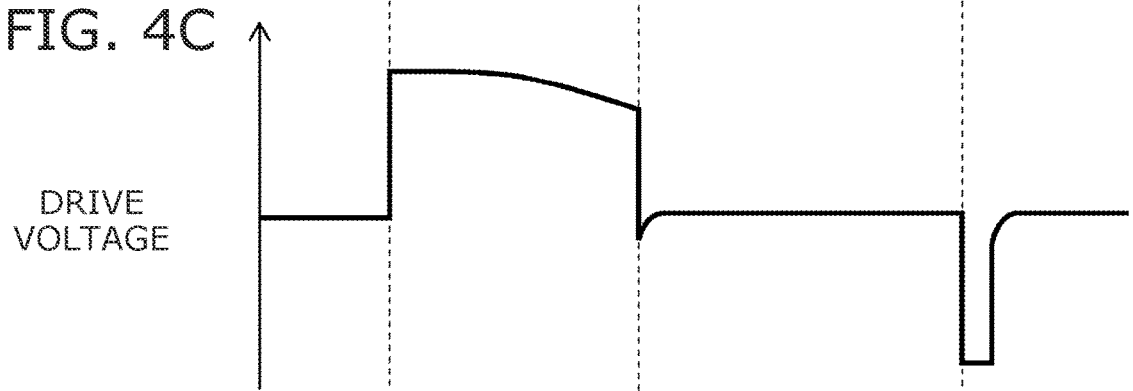
FIG. 4C DRIVE VOLTAGE
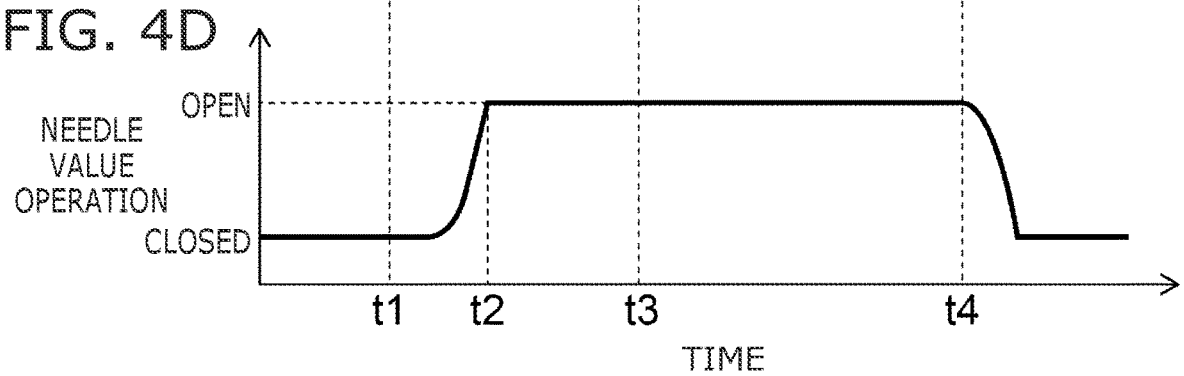
FIG. 4D NEEDLE VALUE OPERATION

DIESEL ENGINE, DIESEL ENGINE MANUFACTURING METHOD, AND DIESEL ENGINE INJECTION-AMOUNT CORRECTION SYSTEM

TECHNICAL FIELD

The present invention relates to a diesel engine, a diesel engine manufacturing method, and a diesel engine injection-amount correction system.

BACKGROUND ART

In an electronic control unit (ECU) which controls driving by an injector that injects a fuel, there are individual differences in circuits. For example, the individual differences in the ECU circuits are caused by variations in capacitor components and resistance components of capacitors included in the circuits, variations in inductance components and resistance components of coils included in the circuits, or the like. Alternatively, the individual differences in the ECU circuits are caused by, e.g., manufacturing tolerances, temperature tolerances, endurance tolerances, or the like of individual elements included in the circuits, such as capacitors and coils.

Accordingly, when there are individual differences in the ECU circuits, a voltage supplied from the ECU to the injector, i.e., an injector drive voltage varies. When the injector drive voltage varies, an injector drive current varies. In a direct-acting injector that uses a solenoid to directly drive a needle valve and inject a fuel, the injector drive current determines a movement amount and a moving speed of the needle valve of the injector. Consequently, in a diesel engine in which the direct-acting injector is mounted, even though an injector energization time is constant, when the injector drive current varies, a fuel injection amount of the injector varies. This may result in a case where, in minimal fuel injection in which a fuel of about 6 $mm^3$/stroke (st) or less is injected, accuracy required of the fuel injection amount is not satisfied or the minimal fuel injection disappears.

By contrast, PTL 1 discloses an electromagnetic valve drive device in which, even when individual differences are produced in circuits or injectors, an energization current to the injector can appropriately be adjusted. In the electromagnetic valve drive device disclosed in PTL 1, while a vehicle is running, a microcomputer uses a gain unit and an A/D conversion unit to detect a terminal voltage from the start of energization to the injector until a flyback voltage converges, and causes a memory to save and store the terminal voltage as a digital value. In the memory, an approximation formula is stored, and a comparison unit of the microcomputer specifies a feature point on the basis of the approximation formula for the terminal voltage stored in the memory, and corrects an energization indication value to the injector, which is for a correction logic unit to close an electromagnetic valve of the injector according to the feature value.

However, when the microcomputer uses the gain unit and the A/D conversion unit to detect the terminal voltage, while the vehicle is running, and causes the memory to save and store the terminal voltage as the digital value, a problem arises in that an ECU circuit is complicated or various sensor are required.

CITATION LIST

Patent Literature

[PTL 1] Japanese Patent Application Publication No. 2017-57755

SUMMARY OF INVENTION

Technical Problem

The present invention has been achieved in view of the circumstances described above, and an object thereof is to provide a diesel engine, a diesel engine manufacturing method, and a diesel engine injection-amount correction system which can easily improve accuracy of correction of variations in fuel injection amount.

Solution to Problem

The problem described above is solved by a diesel engine according to the present invention including: an injector that uses a solenoid to directly drive a needle valve and inject a fuel; and an injector control device that controls the driving by the injector, the injector control device including: a charge voltage control circuit that stores an electric energy in a capacitor on the basis of a voltage supplied from a battery; a storage unit that stores a correction value related to an injection amount of the fuel injected from the injector; and an injector control circuit that controls the driving by the injector on the basis of each of a voltage supplied from the charge voltage control circuit and the correction value stored in the storage unit, the correction value being set according to a voltage applied to a terminal of the injector control device connected to a load when a current starts to flow in the load connected to the injector control device.

In the diesel engine according to the present invention, the storage unit of the injector control device that controls the driving by the injector stores the correction value related to the injection amount of the fuel injected from the injector. The correction value is set according to the voltage applied to the terminal of the injector control device connected to the load when the current starts to flow in the load connected to the injector control device. In other words, the correction value is set according to an initial voltage at the terminal of the injector control device when a voltage supplied from the injector control device to the injector, i.e., an injector drive voltage is highest during an injector energization time.

It is to be noted herein that the injector drive voltage determines an injector drive current. In a direct-acting injector that uses a solenoid to directly drive a needle value and inject a fuel, the injector drive current determines a movement amount and a moving speed of the needle value of the injector. Accordingly, in the diesel engine in which the direct-acting injector is mounted, there is a correlation between the injector drive current and a fuel injection amount of the injector. Consequently, in the diesel engine in which the direct-acting injector is mounted, there is a correlation between the injector drive voltage and the fuel injection amount of the injector.

In the injector control device, in an initial stage of fuel injection, a boosted voltage obtained by boosting the voltage supplied from the battery, i.e., a charge voltage for the capacitor included in the charge voltage control circuit of the injector control device is supplied to the solenoid of the injector to open the needle value of the injector. Subsequently, the injector control device supplies a voltage lower than the charge voltage supplied in the early stage of the fuel injection, i.e., the voltage supplied from the battery to the solenoid to hold a state where the needle valve of the injector is open. Subsequently, when a preset injector energization time has elapsed from a time when energization of the injector was started, the injector control device stops the supply of the voltage to the solenoid to close the needle valve of the injector and stop the fuel injection.

According to the findings made by the present inventors, a value of the charge voltage for the capacitor when the energization of the injector is started affects the fuel injection amount. In other words, the injector drive voltage which is highest during the injector energization time affects the fuel injection amount. As described previously, in the diesel engine according to the present invention, the correction value is set according to the voltage applied to the terminal of the injector control device connected to the load when the current starts to flow in the load connected to the injector control device. In other words, the correction value is set according to the initial voltage at the terminal of the injector control device when the injector drive voltage is highest during the injector energization time. Then, the injector control circuit of the injector control device controls the driving by the injector on the basis of each of the voltage supplied from the charge voltage control circuit and the correction value related to the fuel injection amount stored in the storage unit. The load need not necessarily be mounted in the diesel engine, and may also be, e.g., a load placed in a production process of the diesel engine. This allows the diesel engine according to the present invention to easily improve accuracy of correction of variations in fuel injection amount.

In the diesel engine according to the present invention, it is preferable that the injector control circuit controls the driving by the injector on the basis of the correction value when the injection amount is not more than a predetermined amount.

In the diesel engine according to the present invention, when the fuel injection amount is not more than the predetermined amount, the injector control circuit controls the driving by the injector on the basis of the correction value related to the fuel injection amount stored in the storage unit. This allows the diesel engine according to the present invention to ensure accuracy required of the fuel injection amount in, e.g., minimal fuel injection in which a minimal fuel is injected and inhibit minimal fuel injection from disappearing.

In the diesel engine according to the present invention, it is preferable that the voltage applied to the terminal is measured by a voltage measurement device in a production process, and the correction value is set according to the voltage measured by the voltage measurement device and stored in the storage unit in the production process.

In the diesel engine according to the present invention, the voltage applied to the terminal of the injector control device connected to the load when the current starts to flow in the load connected to the injector control device is measured by the voltage measurement device in the production process of the diesel engine. In addition, the correction value is set according to the voltage measured by the voltage measurement device and stored in the storage unit in the production process of the diesel engine. Accordingly, the correction value related to the fuel injection amount is set using the load and the voltage measurement device each placed in the production process of the diesel engine and stored in the storage unit. Therefore, a voltage detection unit that detects, e.g., the charge voltage for the capacitor, the voltage at the terminal of the injector control device, and the like need not necessarily be mounted in the diesel engine. This allows the diesel engine according to the present invention to simplify a circuit of the injector control device and more easily improve the accuracy of correction of variations in fuel injection amount.

In the diesel engine according to the present invention, it is preferable that the current flows in the load as a result of inputting of a pulse signal corresponding to a rotation number of not more than an idling rotation number to the injector control device.

In the diesel engine according to the present invention, the pulse signal corresponding to the rotation number of not more than the idling rotation number is input to the injector control device, and therefore the current flows in the load connected to the injector control device. Consequently, the injector drive current simulating the injector drive current when, e.g., the diesel engine is activated (e.g., during cranking) flows in the load connected to the injector control device. As a result, the correction value is set according to the initial voltage at the terminal of the injector control device when the minimal fuel smallest in amount during the operation of the diesel engine is injected. This allows the diesel engine according to the present invention to more reliably ensure the accuracy required of the minimal fuel injection amount and more reliably inhibit the minimal fuel injection from disappearing.

In the diesel engine according to the present invention, the load is an injector dummy load having a coil and a resistor and simulating the injector.

In the diesel engine according to the present invention, the load connected to the injector control device is not the injector mounted in the diesel engine, but the injector dummy load simulating the injector. As a result, even when the injector mounted in the diesel engine is not used, it is possible to cause the storage unit to store the correction value related to the injection amount of the fuel in, e.g., a production process of an ECU including the injector control device. This allows the diesel engine according to the present invention to easily improve the accuracy of correction of variations in fuel injection amount.

The problem described above is solved by a diesel engine manufacturing method according to the present invention, which is a method of manufacturing a diesel engine including an injector that uses a solenoid to directly drive a needle valve and inject a fuel and an injector control device that controls the driving by the injector, the diesel engine manufacturing method including: a signal inputting step of inputting a control signal to the injector control device; a voltage measurement step of measuring a voltage applied to a terminal of the injector control device connected to a load when a current starts to flow in the load connected to the injector control device due to the signal inputting step; a correction value setting step of setting a correction value related to an injection amount of the fuel injected from the injector according to the voltage measured by the voltage measurement step; and a correction value writing step of causing a storage unit of the injector control device to store the correction value set by the correction value setting step.

According to the diesel engine manufacturing method according to the present invention, in the signal inputting step, the control signal is input to the injector control device. As a result, the current starts to flow in the load connected to the injector control device. At that time, in the voltage measurement step, the voltage applied to the terminal of the injector control device connected to the load is measured. Subsequently, in the correction value setting step, the correction value related to the injection amount of the fuel injected from the injector is set according to the voltage measured by the voltage measurement step. In other words, the correction value is set according to an initial voltage at the terminal of the injector control device when a voltage supplied from the injector control device to the injector, i.e., an injector drive voltage is highest during an injector energization time. Subsequently, in the correction value writing step, the storage unit of the injector control device is caused to store the correction value set by the correction value setting step.

It is to be noted herein that the injector drive voltage determines an injector drive current. In a direct-acting injector that uses a solenoid to directly drive a needle value and inject a fuel, the injector drive current determines a movement amount and a moving speed of the needle value of the injector. Accordingly, in the diesel engine in which the direct-acting injector is mounted, there is a correlation between the injector drive current and a fuel injection amount of the injector. Consequently, in the diesel engine in which the direct-acting injector is mounted, there is a correlation between the injector drive voltage and the fuel injection amount of the injector.

In the injector control device, in an initial stage of fuel injection, a boosted voltage obtained by boosting the voltage supplied from the battery, i.e., a charge voltage for the capacitor included in the injector control device is supplied to the solenoid of the injector to open the needle value of the injector. Subsequently, the injector control device supplies a voltage lower than the charge voltage supplied in the early stage of the fuel injection, i.e., the voltage supplied from the battery to the solenoid to hold a state where the needle valve of the injector is open. Subsequently, when a preset injector energization time has elapsed from a time when energization of the injector was started, the injector control device stops the supply of the voltage to the solenoid to close the needle valve of the injector and stop the fuel injection.

According to the findings made by the present inventors, a value of the charge voltage for the capacitor when the energization of the injector is started affects the fuel injection amount. In other words, the injector drive voltage which is highest during the injector energization time affects the fuel injection amount. As described previously, in the diesel engine manufacturing method according to the present invention, in the correction value setting step, the correction value related to the injection amount of the fuel injected from the injector is set according to the voltage measured by the voltage measurement step, i.e., the voltage applied to the terminal of the injector control device connected to the load when the current starts to flow in the load connected to the injector control device. In other words, the correction value is set according to the initial voltage at the terminal of the injector control device when the injector drive voltage is highest during the injector energization time. The load need not necessarily be mounted in the diesel engine, and may also be, e.g., a load placed in a production process of the diesel engine. This allows the diesel engine manufacturing method according to the present invention to easily improve accuracy of correction of variations in fuel injection amount.

In the diesel engine manufacturing method according to the present invention, it is preferable that the signal inputting step, the voltage measurement step, the correction value setting step, and the correction value writing step are performed in a production process of the diesel engine.

According to the diesel engine manufacturing method according to the present invention, the signal inputting step, the voltage measurement step, the correction value setting step, and the correction value writing step are performed in a production process of the diesel engine. Consequently, the correction value related to the fuel injection amount is set using the signal inputting step, the voltage measurement step, and the correction value setting step in the production process of the diesel engine, and stored in the storage unit using the correction value writing step. Therefore, in the diesel engine manufacturing method according to the present invention, a voltage detection unit that detects, e.g., a charge voltage for a capacitor, the voltage at the terminal of the injector control device, and the like need not necessarily be mounted in the diesel engine. This allows the diesel engine manufacturing method according to the present invention to simplify the circuit of the injector control device and more easily improve the accuracy of correction of variations in fuel injection amount.

In the diesel engine manufacturing method according to the present invention, it is preferable that the control signal is a pulse signal corresponding to a rotation number of not more than an idling rotation number of the diesel engine.

According to the diesel engine manufacturing method according to the present invention, in the signal inputting step, the pulse signal corresponding to the rotation number of not more than the idling rotation number is input as the control signal to the injector control device. Consequently, an injector drive current simulating that when, e.g., the diesel engine is activated (e.g., during cranking) flows in the load connected to the injector control device. As a result, the correction value is set according to the initial voltage at the terminal of the injector control device when a minimal fuel smallest in amount during the operation of the diesel engine is injected. This allows the diesel engine manufacturing method according to the present invention to more reliably ensure accuracy required of a minimal fuel injection amount and more reliably inhibit minimal fuel injection from disappearing.

In the diesel engine manufacturing method according to the present invention, it is preferable that the load is an injector dummy load having a coil and a resistor and simulating the injector.

According to the diesel engine manufacturing method according to the present invention, the load connected to the injector control device is not the injector mounted in the diesel engine, but the injector dummy load simulating the injector. As a result, even when the injector mounted in the diesel engine is not used, it is possible to cause the storage unit to store the correction value related to the injection amount of the fuel in, e.g., a production process of an ECU including the injector control device. This allows the diesel engine manufacturing method according to the present invention to easily improve the accuracy of correction of variations in fuel injection amount.

The problem described above is solved by a diesel engine fuel-amount correction system according to the present invention including: an injector control device that controls driving by an injector that uses a solenoid to directly drive a needle valve and inject a fuel; a control signal generation device that generates a control signal which controls the injector control device and inputs the control signal to the injector control device; a load connected to the injector control device; a voltage measurement device that measures a voltage applied to a terminal of the injector control device connected to the load when a current starts to flow in the load due to the control signal; a correction value setting device that sets a correction value related to an injection amount of the fuel injected from the injector according to the voltage measured by the voltage measurement device; and a correction value writing device that causes a storage unit of the injector control device to store the correction value set by the correction value setting device.

In the diesel engine injection-amount correction system according to the present invention, the control signal generation device generates the control signal which controls the injector control device and inputs the control signal to the injector control device. As a result, the current starts to flow in the load connected to the injector control device. At that time, the voltage measurement device measures the voltage applied to the terminal of the injector control device connected to the load. The correction value setting device sets the correction value related to the injection amount of the fuel injected from the injector according to the voltage measured by the voltage measurement device. In other words, the correction value setting device sets the correction value according to an initial voltage at the terminal of the injector control device when a voltage supplied from the injector control device to the injector, i.e., an injector drive voltage is highest during an injector energization time. The correction value writing device causes the storage unit of the injector control device to store the correction value set by the correction value setting device.

It is to be noted herein that the injector drive voltage determines an injector drive current. In a direct-acting injector that uses a solenoid to directly drive a needle value and inject a fuel, the injector drive current determines a movement amount and a moving speed of the needle value of the injector. Accordingly, in the diesel engine in which the direct-acting injector is mounted, there is a correlation between the injector drive current and a fuel injection amount of the injector. Consequently, in the diesel engine in which the direct-acting injector is mounted, there is a correlation between the injector drive voltage and the fuel injection amount of the injector.

In the injector control device, in an initial stage of fuel injection, a boosted voltage obtained by boosting the voltage supplied from the battery, i.e., a charge voltage for the capacitor included in the injector control device is supplied to the solenoid of the injector to open the needle value of the injector. Subsequently, the injector control device supplies a voltage lower than the charge voltage supplied in the early stage of the fuel injection, i.e., the voltage supplied from the battery to the solenoid to hold a state where the needle valve of the injector is open. Subsequently, when a preset injector energization time has elapsed from a time when energization of the injector was started, the injector control device stops the supply of the voltage to the solenoid to close the needle valve of the injector and stop the fuel injection.

According to the findings made by the present inventors, a value of the charge voltage for the capacitor when the energization of the injector is started affects the fuel injection amount. In other words, the injector drive voltage which is highest during the injector energization time affects the fuel injection amount. As described previously, in the diesel engine fuel-amount correction system according to the present invention, the correction value setting device sets the correction value related to the injection amount of the fuel injected from the injector according to the voltage measured by the voltage measurement device, i.e., the voltage applied to the terminal of the injector control device connected to the load when the current starts to flow in the load due to the control signal. In other words, the correction value setting device sets the correction value according to the initial voltage at the terminal of the injector control device when the injector drive voltage is highest during the injector energization time. The load need not necessarily be mounted in the diesel engine, and may also be, e.g., a load placed in a production process of the diesel engine. This allows the diesel engine fuel-amount correction system according to the present invention to easily improve accuracy of correction of variations in fuel injection amount.

In the diesel engine injection-amount correction system according to the present invention, it is preferable that the control signal generation device inputs the control signal to the injector control device in the production process of the diesel engine in which the injector is to be mounted, the voltage measurement device measures the voltage applied to the terminal of the injector control device in the production process of the diesel engine, the correction value setting device sets the correction value in the production process of the diesel engine, and the correction value writing device stores the correction value in the storage unit in the production process of the diesel engine.

In the diesel engine injection-amount correction system according to the present invention, the voltage measurement device measures, in the production process of the diesel engine, the voltage applied to the terminal of the injector control device connected to the load when the current starts to flow in the load connected to the injector control device. Meanwhile, the correction value setting device sets, in the production process of the diesel engine, the correction value according to the voltage measured by the voltage measurement device. Then, the correction value writing device causes, in the production process of the diesel engine, the storage unit of the injector control device to store the correction value set by the correction value setting device. Therefore, a voltage detection unit that detects, e.g., a charge voltage for a capacitor, the voltage at the terminal of the injector control device, and the like need not necessarily be mounted in the diesel engine. This allows the diesel engine injection-amount correction system according to the present invention to simplify a circuit of the injector control device and more easily improve the accuracy of correction of variations in fuel injection amount.

In the diesel engine injection-amount correction system according to the present invention, it is preferable that the control signal is a pulse signal corresponding to a rotation number of not more than an idling rotation number of the diesel engine.

In the diesel engine injection-amount correction system according to the present invention, the control signal generation device inputs, as the control signal, the pulse signal corresponding to the rotation number of not more than the idling rotation number of the diesel engine to the injector control device, and therefore the current flows in the load connected to the injector control device. Consequently, the injector drive current simulating that when, e.g., the diesel engine is activated (e.g., during cranking) flows in the load connected to the injector control device. As a result, the correction value is set according to the initial voltage at the terminal of the injector control device when a minimal fuel smallest in amount during the operation of the diesel engine is injected. This allows the diesel engine injection-amount correction system according to the present invention to more reliably ensure the accuracy required of a minimal fuel injection amount and more reliably inhibit minimal fuel injection from disappearing.

In the diesel engine injection-amount correction system according to the present invention, it is preferable that the load is an injector dummy load having a coil and a resistor and simulating the injector.

In the diesel engine injection-amount correction system according to the present invention, the load connected to the injector control device is not the injector mounted in the diesel engine, but the injector dummy load simulating the injector. As a result, even when the injector mounted in the diesel engine is not used, it is possible to cause the storage unit to store the correction value related to the injection amount of the fuel in, e.g., a production process of an ECU including the injector control device. This allows the diesel engine injection-amount correction system according to the present invention to easily improve the accuracy of correction of variations in fuel injection amount.

Advantageous Effects of Invention

According to the present invention, it is possible to provide a diesel engine, a diesel engine manufacturing method, and a diesel engine injection-amount correction system which can easily improve accuracy of correction of variations in fuel injection amount.

BRIEF DESCRIPTION OF DRAWINGS

FIG. 4 is a timing chart illustrating relationships among an injector drive signal, an injector drive voltage, an injector drive current, and an operation of a needle valve.

DESCRIPTION OF EMBODIMENTS

Figure 1:
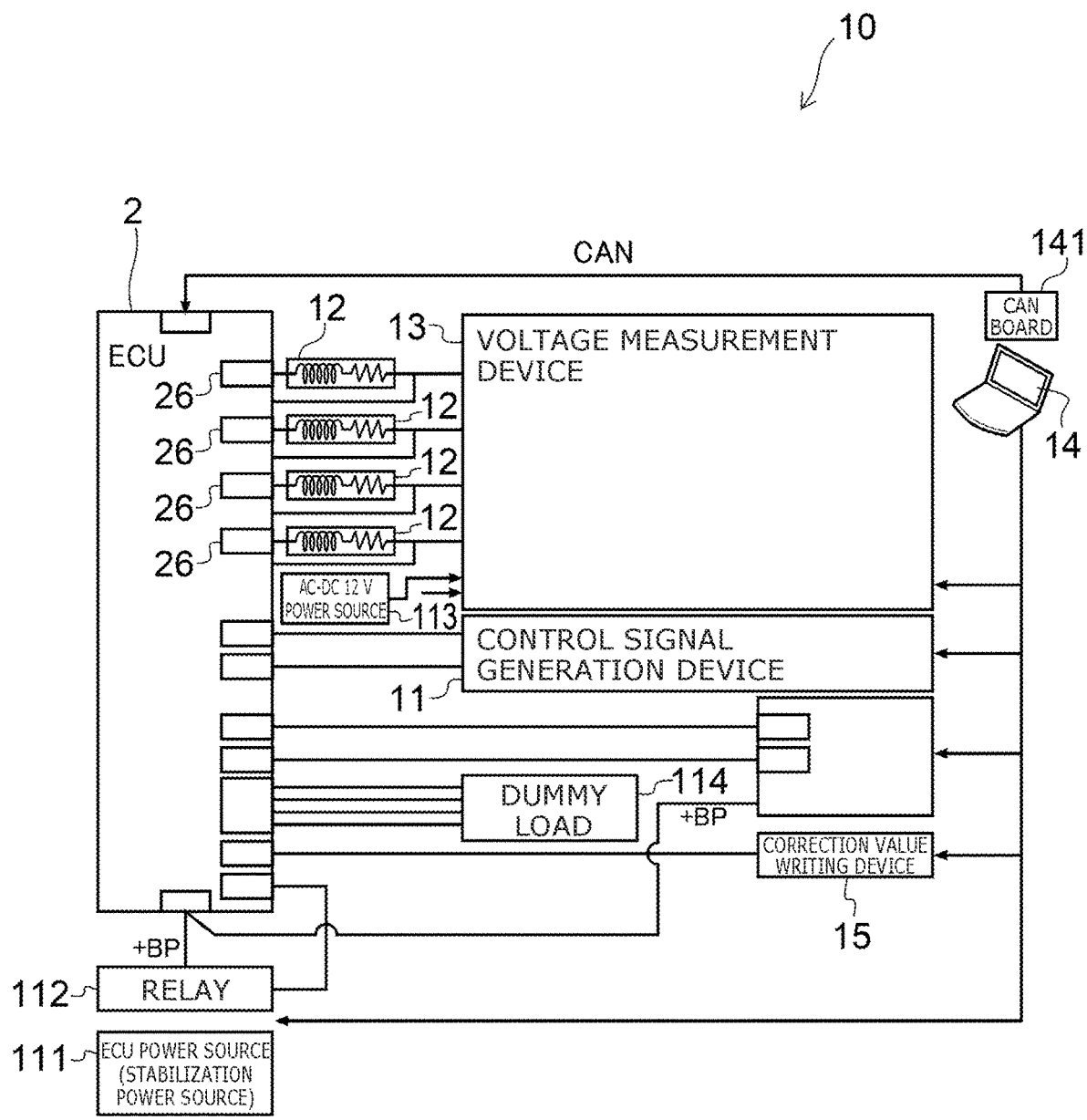
FIG. 1 is a block diagram illustrating a diesel engine injection-amount correction system according to each embodiment of the present invention.

Referring to the drawings, preferred embodiments of the present invention will be described below in detail.

The embodiments described below are preferred specific examples of the present invention, and therefore various technically preferred limitations are added, but the scope of the present invention is not limited to these embodiments unless specifically described in the following description to limit the present invention. In the drawings, the same components are denoted by the same reference numerals, and a detailed description thereof will be omitted as appropriate.

FIG. 1 is a block diagram illustrating a diesel engine injection-amount correction system according to each embodiment of the present invention.

A diesel engine injection-amount correction system 10 according to the present embodiment corrects, in a production process of a diesel engine 30 (see FIG. 2), a fuel injection amount of an injector 4 (see FIG. 2) mounted in the diesel engine 30. As illustrated in FIG. 1, the diesel engine injection-amount correction system 10 includes an injector control device 2, a control signal generation device 11, an injector dummy load 12, a voltage measurement device 13, a correction value setting device 14, and a correction value writing device 15.

The injector control device 2 operates with a voltage supplied from an ECU power source 111 via a relay 112 to function as a portion of an electronic control unit (ECU). The injector control device 2 controls driving by the injector 4. Details of the injector control device 2 will be described later.

The control signal generation device 11 generates a control signal which controls the injector control device 2, and inputs the control signal to the injector control device 2. Examples of the control signal generated by the control signal generation device 11 and input to the injector control device 2 include a pulse signal related to a rotation number of a crankshaft of the diesel engine 30, a pulse signal related to a rotation number of a camshaft of the diesel engine 30, and the like. For example, the control signal generation device 11 in the present embodiment generates a pulse signal corresponding to a rotation number of not more than an idling rotation number of the diesel engine 30, and inputs the pulse signal to the injector control device 2. The rotation number of not more than the idling rotation number of the diesel engine 30 is, e.g., about 500 rpm, which is the rotation number simulating the rotation number when the diesel engine 30 is activated (e.g., during cranking).

The injector dummy load 12 is an example of a "load" in the present invention, which is connected at one end portion to a terminal 26 of the injector control device 2, while being connected at another end portion to the voltage measurement device 13. The injector dummy load 12 has a coil and a resistor and simulates the injector 4 of the diesel engine 30. When the control signal generated by the control signal generation device 11 is input to the injector control device 2, the injector control device 2 supplies a voltage to the injector dummy load 12. As a result, a current flows in the injector dummy load 12.

The voltage measurement device 13 is connected to the injector dummy load 12. The voltage measurement device 13 operates with a voltage supplied from an AC-DC power source 113 to measure the voltage applied to the injector dummy load 12. Specifically, the voltage measurement device 13 measures the voltage applied to the terminal 26 of the injector control device 2 connected to the injector dummy load 12.

The correction value setting device 14 is connected to the voltage measurement device 13. The correction value setting device 14 sets a correction value related to an injection amount of a fuel injected from the injector 4 according to the voltage measured by the voltage measurement device 13 and transmitted from the voltage measurement device 13. In the diesel engine injection-amount correction system 10 illustrated in FIG. 1, the correction value setting device 14 is illustrated as a voltage measurement computer. However, the correction value setting device 14 is not limited to the voltage measurement computer. As illustrated in FIG. 1, the correction value setting device 14 has a CAN board 141, and may also be communicative with the injector control device 2 via a CAN (Controller Area Network). Note that, in the diesel engine injection-amount correction system 10 according to the present embodiment, the correction value setting device 14 need not necessarily have the CAN board 141.

The correction value writing device 15 is connected to the correction value setting device 14. The correction value writing device 15 inputs the correction value set by the correction value setting device 14 to the injector control device 2. For example, the correction value writing device 15 causes a storage unit 25 (see FIG. 2) of the injector control device 2 to store the correction value. Note that the correction value writing device 15 can write not only the correction value related to the injection amount of the fuel injected from the injector 4, but also various data to the ECU. In other words, the correction value writing device 15 functions as a portion of an ECU writing device.

As also illustrated in FIG. 1, the dummy load 114 is connected to the injector control device 2. The dummy load 114 can cover loads in which errors have occurred. Note that the diesel engine injection-amount correction system 10 according to the present embodiment need not necessarily include the dummy load 114.

Figure 2:
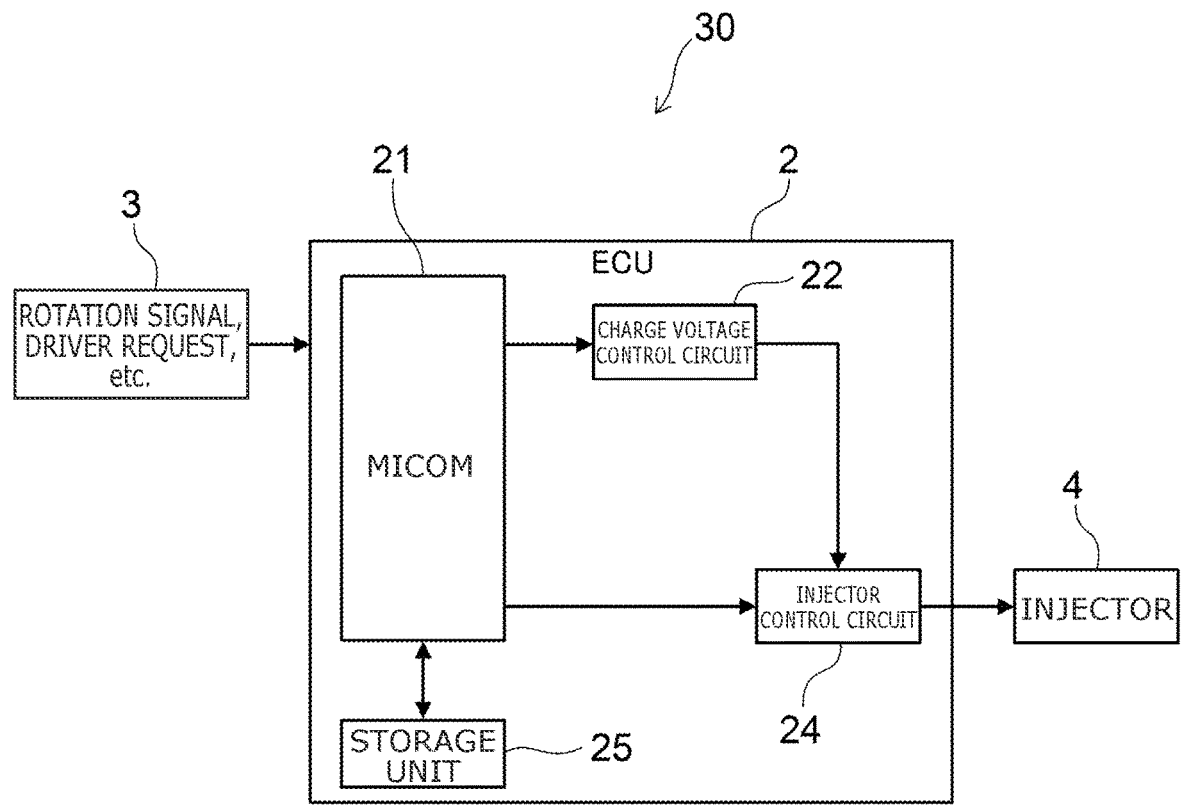
FIG. 2 is a block diagram illustrating an outline of a diesel engine according to the embodiment of the present invention.

FIG. 2 is a block diagram illustrating an outline of the diesel engine according to the embodiment of the present invention.

Figure 3:
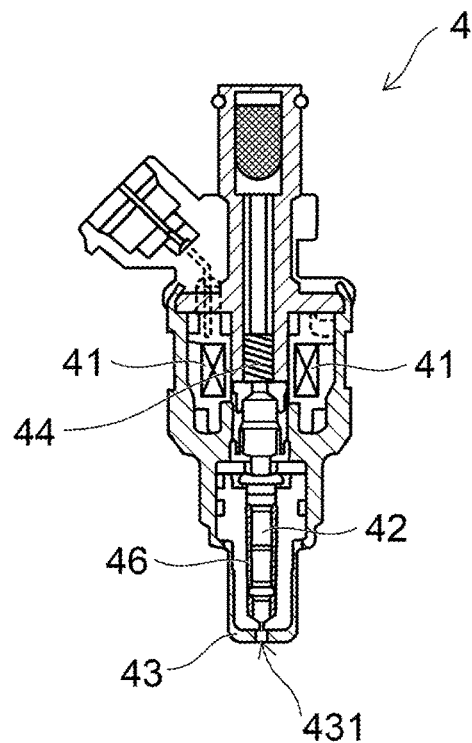
FIG. 3 is a cross-sectional view illustrating an injector in the present embodiment.

FIG. 3 is a cross-sectional view illustrating the injector in the present embodiment.

Note that FIG. 3(a) is a cross-sectional view illustrating the entire injector in the present embodiment. FIG. 3(b) is a cross-sectional view illustrating a region A1 illustrated in FIG. 3(a) in enlarged relation. FIG. 3(c) is a cross-sectional view illustrating a region A2 illustrated in FIG. 3(a) in enlarged relation.

As illustrated in FIG. 2, the diesel engine 30 according to the present embodiment includes the injector control device 2 and the injector 4. The injector control device 2 is mounted in the diesel engine 30 to control the driving by the injector 4 that injects the fuel. As illustrated in FIG. 2, the injector control device 2 according to the present embodiment includes a microcomputer (hereinafter, for the sake of convenience, referred to as the "MICOM") 21, a charge voltage control circuit 22, an injector control circuit 24, and the storage unit 25, and functions a portion of the electronic control unit (ECU). In the following description, for the sake of convenience, the microcomputer is referred to as the "MICOM".

As illustrated in FIG. 2, to the injector control device 2, engine operation information 3 detected by various sensors is input. Examples of the engine operation information 3 include a rotation signal related to an engine rotation number and a signal related to a driver request such as an accelerator position.

As described previously, the injector control device 2 controls the driving by the injector 4. The injector 4 has a structure of a normally-closed-type (i.e., normally-closed) electromagnetic valve. As illustrated in in FIGS. 3(a) to 3(c), the injector 4 in the present embodiment has a solenoid 41, a needle valve 42, a sheet portion 43, and a return spring 44. When a voltage is supplied to the solenoid 41 on the basis of the control signal transmitted from the injector control device 2, the solenoid 41 serves as an electromagnet to attract the needle valve 42 against a biasing force of the return spring 44. As a result, a fuel 46 is injected from a nozzle hole 431 provided in a leading end of the sheet portion 43. Meanwhile, when the supply of the voltage to the solenoid 41 is stopped on the basis of the control signal transmitted from the injector control device 2, the solenoid 41 loses a magnetic force. Then, the needle valve 42 receives the biasing force of the return spring 44 to return to an original position and close the nozzle hole 431. Consequently, the injection of the fuel 46 is stopped. Thus, the injector 4 in the present embodiment uses the solenoid 41 to directly drive the needle valve 42 and inject the fuel 46 from the nozzle hole 431.

The MICOM 21 has a function of a CPU (Central Processing Unit), and reads a program stored in the storage unit 25 to perform various arithmetic operations and processing.

The charge voltage control circuit 22 has a function of a so-called boosting circuit, and has a coil, a capacitor, a switching element such as a transistor, and a rectifier element such as a diode. The charge voltage control circuit 22 switches between ON/OFF states of the switching element to boost a voltage supplied from a battery, and stores electric energy in the capacitor. In other words, the charge voltage control circuit 22 stores the electric energy in the capacitor on the basis of the voltage supplied from the battery.

The injector control circuit 24 controls the driving by the injector 4 on the basis of each of the voltage supplied from the charge voltage control circuit 22 and an energization time set by the MICOM 21.

For example, the injector control circuit 24 supplies, in an early stage of fuel injection, a boosted voltage obtained by boosting the voltage supplied from the battery, i.e., a charge voltage for the capacitor to the solenoid 41 of the injector 4 to open the needle valve 42 of the injector 4. In other words, the boosted voltage generated by the charge voltage control circuit 22, i.e., the charge voltage is supplied to the injector 4 via the injector control circuit 24. When the energization time set by the MICOM 21 has elapsed from a time where energization of the injector 4 was started (i.e., a time when the supply of the voltage to the injector 4 was started), the injector control circuit 24 stops the supply of the voltage to the solenoid 41 of the injector 4.

As described previously with reference to FIG. 1, the correction value related to the injection amount of the fuel is stored by the correction value writing device 15 in the storage unit 25 of the injector control device 2. The correction value related to the injection amount of the fuel is, e.g., a correction value related to the energization time for the injector 4. The energization time set by the MICOM 21 may be an energization time set on the basis of the correction value stored in the storage unit 25. Alternatively, the energization time set by the MICOM 21 may also be an energization time set not on the basis of the correction value stored in the storage unit 25. For example, the MICOM 21 of the injector control device 2 in the present embodiment controls, when minimal fuel injection is to be performed, the driving by the injector 4 using the energization time set on the basis of the correction value stored in the storage unit 25. In the description of the present invention, the "minimal fuel injection" includes a case of fuel injection in which a fuel of about 6 $mm^3$/stroke (st) or less is injected and a case of fuel injection in which, after the needle valve 42 of the injector 4 started an opening operation, the needle valve 42 starts a closing operation without fully opening. Details of the setting of the correction value related to the injection amount of the fuel will be described later.

The storage unit 25 saves (stores) a program to be executed by the MICOM 21. As the storage unit 25, a ROM (Read Only Memory), a RAM (Random Access Memory), or the like can be listed. Note that the storage unit 25 may also be an external storage device connected to the injector control device 2.

In the injector control device 2 according to the present embodiment, the charge voltage control circuit 22 and the injector control circuit 24 may also be implemented through execution of the program stored in the storage unit 25 by the MICOM 21, implemented by hardware, or implemented by a combination of hardware and software.

Next, referring to the drawings, relationships among the injector drive voltage, the injector drive current, and an operation of the needle valve will be described in detail.

FIG. 4 is a timing chart illustrating the relationships among an injector drive signal, the injector drive voltage, the injector drive current, and the operation of the needle valve.

FIG. 5 is a timing chart illustrating a relationship between the injector drive current and a movement amount of the needle valve.

As described previously with reference to FIG. 2, the engine operation information 3 including, e.g., a rotation signal related to an engine rotation number and a signal related to the driver request such as the accelerator position is input to the injector control device 2. As a result, as illustrated in FIG. 4(a), the MICOM 21 outputs the drive signal for the injector 4 to the injector control circuit 24 to start the driving by the injector 4 (timing t1). As illustrated in FIG. 4(a), the drive signal for the injector 4 is, e.g., a pulse signal.

As illustrated in FIG. 4l, when receiving the drive signal for the injector 4, the injector control circuit 24 first supplies the boosted voltage generated by the charge voltage control circuit 22, i.e., the charge voltage for the capacitor to the solenoid 41 of the injector 4 at the start of the fuel injection (timing t1). As a result, as illustrated in FIG. 4(b), the drive current for the injector 4 flows in the solenoid 41 of the injector 4 (timing t1). Meanwhile, as illustrated in FIG. 4(d), the needle valve 42 of the injector 4 opens (timing t1). Consequently, the fuel is injected from the nozzle hole 431 of the injector 4.

Subsequently, as illustrated in FIG. 4(d), the needle valve 42 of the injector 4 fully opens (timing t2). As described previously with reference to FIGS. 2 and 3, in the description of the present invention, the "minimal fuel injection" includes the case of the fuel injection in which, after the needle valve 42 of the injector 4 started the opening operation, the needle valve 42 starts the closing operation without fully opening. Accordingly, a period of timing t1 to timing t2 illustrated in FIG. 4(d) is an example of the "minimal fuel injection". When a predetermined time has elapsed from full opening of the needle valve 42 of the injector 4, a current flowing in the solenoid 41 of the injector 4 reaches a peak (timing t3). Thus, in the early stage of the fuel injection, a peak current flows in the solenoid 41 of the injector 4 (timing t3).

Note that, in the early stage of the fuel injection, the charge voltage for the capacitor is supplied to the solenoid 41 of the injector 4 to reach a value of not more than a charge start threshold. As a result, when the current flowing in the solenoid 41 of the injector 4 reaches a peak, the charge voltage control circuit 22 starts to store the electric energy in the capacitor on the basis of the voltage supplied from the battery. Then, when the charge voltage for the capacitor reaches a charge completion threshold, the charge voltage control circuit 22 stops the storage of the electric energy in the capacitor.

When the current flowing in the solenoid 41 of the injector 4 reaches the peak, the injector control circuit 24 supplies a voltage lower than the charge voltage supplied in the early stage of the fuel injection, i.e., the voltage supplied from the battery to the solenoid 41 of the injector 4 to hold a state where the needle valve 42 of the injector 4 is open (timing t3 to timing t4).

Subsequently, when the energization time set by the MICOM 21 has elapsed from the time when the energization of the injector 4 was started (i.e., the time when the supply of the voltage to the solenoid 41 of the injector 4 was started: timing t1), the injector control circuit 24 stops the supply of the voltage to the solenoid 41 of the injector 4 (timing t4). As a result, the fuel injection stops.

In the injector control device 2, there are individual differences in the charge voltage control circuits 22. The individual differences in the charge voltage control circuits 22 are caused by variations in capacitor components included in the charge voltage control circuits 22 and resistor components of the capacitors included in the charge voltage control circuits 22. Alternatively, the individual differences in the charge voltage control circuits 22 are caused by manufacturing tolerances, temperature tolerances, endurance tolerances, or the like of each of elements included in the charge voltage control circuits 22, such as the capacitors and the coils. Note that factors that cause the individual differences in the charge voltage control circuits 22 are not limited only thereto.

When there are individual differences in the charge voltage control circuits 22, the voltage supplied from the injector control circuit 24 to the injector 4, i.e., the drive voltage for the injector 4 varies. When the drive voltage for the injector 4 varies, the drive current for the injector 4 varies. In the direct-acting injector 4 that uses the solenoid 41 to directly drive the needle valve 42 and inject the fuel, the drive current for the injector 4 determines a movement amount and a moving speed of the needle valve 42 of the injector 4. Consequently, in the diesel engine 30 in which the direct-acting injector 4 is mounted, even though the energization time for the injector 4 is constant, when the drive current for the injector 4 varies, the fuel injection amount of the injector 4 varies.

Thus, in the diesel engine 30 in which the direct-acting injector 4 is mounted, there is a correlation between the drive current for the injector 4 and the fuel injection amount of the injector 4. Therefore, in the diesel engine 30 in which the direct-acting injector 4 is mounted, there is a correlation between the drive voltage for the injector 4 and the fuel injection amount of the injector 4.

Figure 5A:
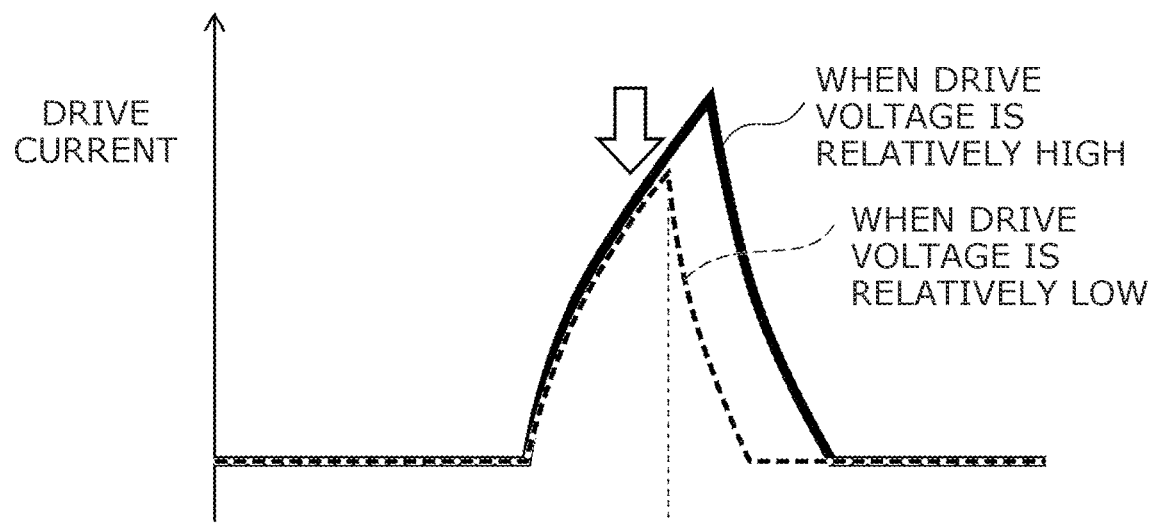
FIG. 5 is a timing chart illustrating a relationship between the injector drive current and a movement amount of the needle valve.
Figure 5B:
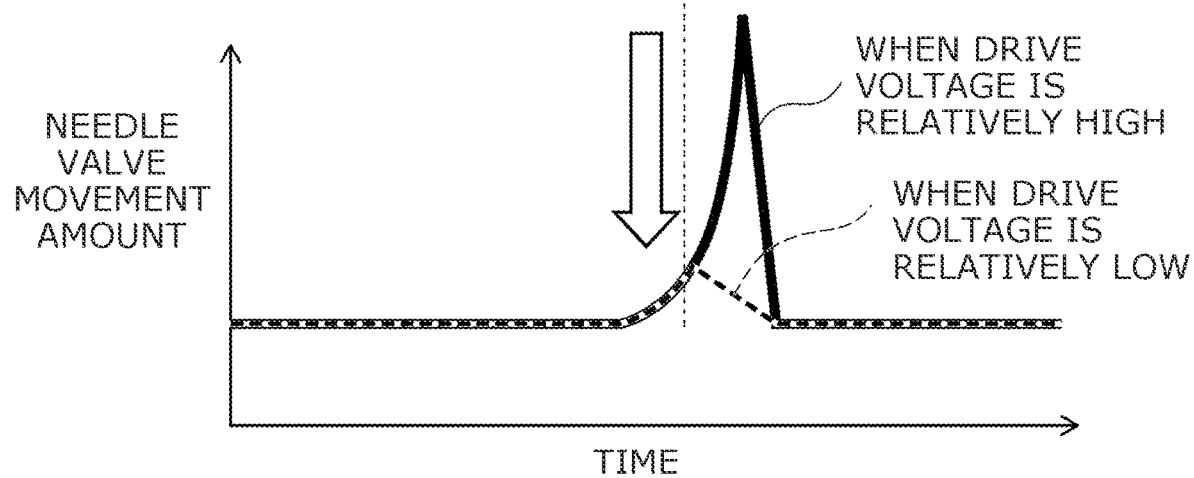

Specifically, when the drive voltage for the injector 4 is relatively high and the drive current for the injector 4 is relatively large as indicated by solid lines illustrated in FIGS. 5(a) and 5(b), the movement amount (i.e., a lift amount) of the needle valve 42 of the injector 4 becomes relatively large or the moving speed of the needle valve 42 of the injector 4 becomes relatively high. As a result, even though the energization time for the injector 4 is constant, the fuel injection amount of the injector 4 relatively increases.

Meanwhile, when the drive voltage for the injector 4 is relatively low and the drive current for the injector 4 is relatively small as indicated by broken lines illustrated in FIGS. 5(a) and 5(b), the movement amount (i.e., the lift amount) of the needle valve 42 of the injector 4 becomes relatively small or the moving speed of the needle valve 42 of the injector 4 becomes relatively low. Consequently, even though the energization time for the injector 4 is constant, the fuel injection amount of the injector 4 relatively decreases. As a result, when, e.g., the minimal fuel injection is performed, there may be a case where accuracy required of the fuel injection amount is not satisfied or a case where the minimal fuel injection disappears.

Note that each of the solid line and the broken line illustrated in FIG. 5(a) indicates the drive current for the injector 4 during the period of timing t1 to timing t2 illustrated in FIG. 4(d), i.e., at the time of the "minimal fuel injection". Meanwhile, each of the solid line and the broken line illustrated in FIG. 5(b) indicates the movement amount of the needle valve 42 during the period of timing t1 to timing t2 illustrated in FIG. 4(d), i.e., at the time of the "minimal fuel injection".

According to the findings made by the present inventors, a value of the charge voltage for the capacitor when the energization of the injector 4 is started affects the fuel injection amount. In other words, the drive voltage for the injector 4 which is highest during the energization time for the injector affects the fuel injection amount.

Accordingly, in the diesel engine injection-amount correction system 10 according to the present embodiment, the voltage measurement device 13 measures the voltage applied to the terminal 26 of the injector control device 2 connected to the injector dummy load 12 when a current starts to flow in the injector dummy load 12 due to the control signal input from the control signal generation device 11 to the injector control device 2. Then, the correction value setting device 14 sets the correction value related to the injection amount of the fuel injected from the injector 4 according to the voltage measured by the voltage measurement device 13, i.e., the voltage applied to the terminal 26 of the injector control device 2 connected to the injector dummy load 12 when a current starts to flow in the injector dummy load 12 due to the control signal. In other words, the correction value setting device 14 sets the correction value according to an initial voltage at the terminal 26 of the injector control device 2 when the drive voltage for the injector 4 is highest during the energization time for the injector 4. Then, the correction value writing device 15 causes the storage unit 25 of the injector control device 2 to store the correction value set by the correction value setting device 14.

Accordingly, in the diesel engine 30 according to the present embodiment, the storage unit 25 of the injector control device 2 that controls the driving by the injector 4 stores the correction value related to the injection amount of the fuel injected from the injector 4. The correction value is set according to the voltage applied to the terminal 26 of the injector control device 2 connected to the injector dummy load 12 when a current starts to flow in the injector dummy load 12 connected to the injector control device 2. In other words, the correction value is set according to the initial voltage at the terminal 26 of the injector control device 2 when the voltage supplied from the injector control device 2 to the injector 4, i.e., the injector drive voltage is highest during the energization time for the injector 4. Then, the injector control circuit 24 of the injector control device 2 controls the driving by the injector 4 on the basis of each of the voltage supplied from the charge voltage control circuit 22 and the correction value related to the fuel injection amount which is stored in the storage unit 25.

As described previously with reference to FIG. 1, the diesel engine injection-amount correction system 10 according to the present embodiment corrects, in the production process of the diesel engine 30, the fuel injection amount of the injector 4 mounted in the diesel engine 30. Therefore, the injector dummy load 12 need not necessarily be mounted in the diesel engine 30, and may also be, e.g., a load placed in the production process of the diesel engine 30. This allows the diesel engine injection-amount correction system 10 and the diesel engine 30 each according to the present embodiment to easily improve the accuracy of correction of variations in fuel injection amount.

In addition, the voltage measurement device 13 measures, in the production process of the diesel engine 30, the voltage applied to the terminal 26 of the injector control device 2 connected to the injector dummy load 12 when a current starts to flow in the injector dummy load 12 connected to the injector control device 2. The correction value setting device 14 sets, in the production process of the diesel engine 30, the correction value according to the voltage measured by the voltage measurement device 13. Then, the correction value writing device 15 causes, in the production process of the diesel engine 30, the storage unit 25 of the injector control device 2 to store the correction value set by the correction value setting device 14. Consequently, the correction value related to the fuel injection amount is set using the injector dummy load 12, the voltage measurement device 13, and the correction value setting device 14 each placed in the production process of the diesel engine 30, and stored in the storage unit 25 by the correction value writing device 15 placed in the production process of the diesel engine 30. Therefore, a voltage detection unit that detects, e.g., the charge voltage for the capacitor, the voltage at the terminal 26 of the injector control device 2, and the like need not necessarily be mounted in the diesel engine 30. This allows the diesel engine injection-amount correction system 10 and the diesel engine 30 each according to the present embodiment to simplify a circuit of the injector control device 2 and more easily improve the accuracy of correction of variations in fuel injection amount.

When the fuel injection amount of the injector 4 is not more than a predetermined amount, i.e., when the minimal fuel injection is to be performed, the injector control circuit 24 controls the driving by the injector 4 by using the energization time set on the basis of the correction value stored in the storage unit 25. This allows the diesel engine 30 according to the present embodiment to ensure, when the minimal fuel injection is to be performed, accuracy required of the fuel injection amount and inhibit the minimal fuel injection from disappearing.

In addition, the load connected to the injector control device 2 is not the injector 4 mounted in the diesel engine 30, but the injector dummy load 12 simulating the injector 4. As a result, even though the injector 4 to be mounted in the diesel engine 30 is not used, it is possible to cause the storage unit 25 to store the correction value related to the injection amount of the fuel in, e.g., a production process of the ECU including the injector control device 2. This allows the diesel engine injection-amount correction system 10 and the diesel engine 30 each according to the present embodiment to easily improve the accuracy of correction of variations in fuel injection amount.

Next, referring to the drawings, an operation of the diesel engine injection-amount correction system 10 according to the present embodiment, i.e., a method of manufacturing the diesel engine 30 according to the present embodiment will be described in detail.

Figure 6:
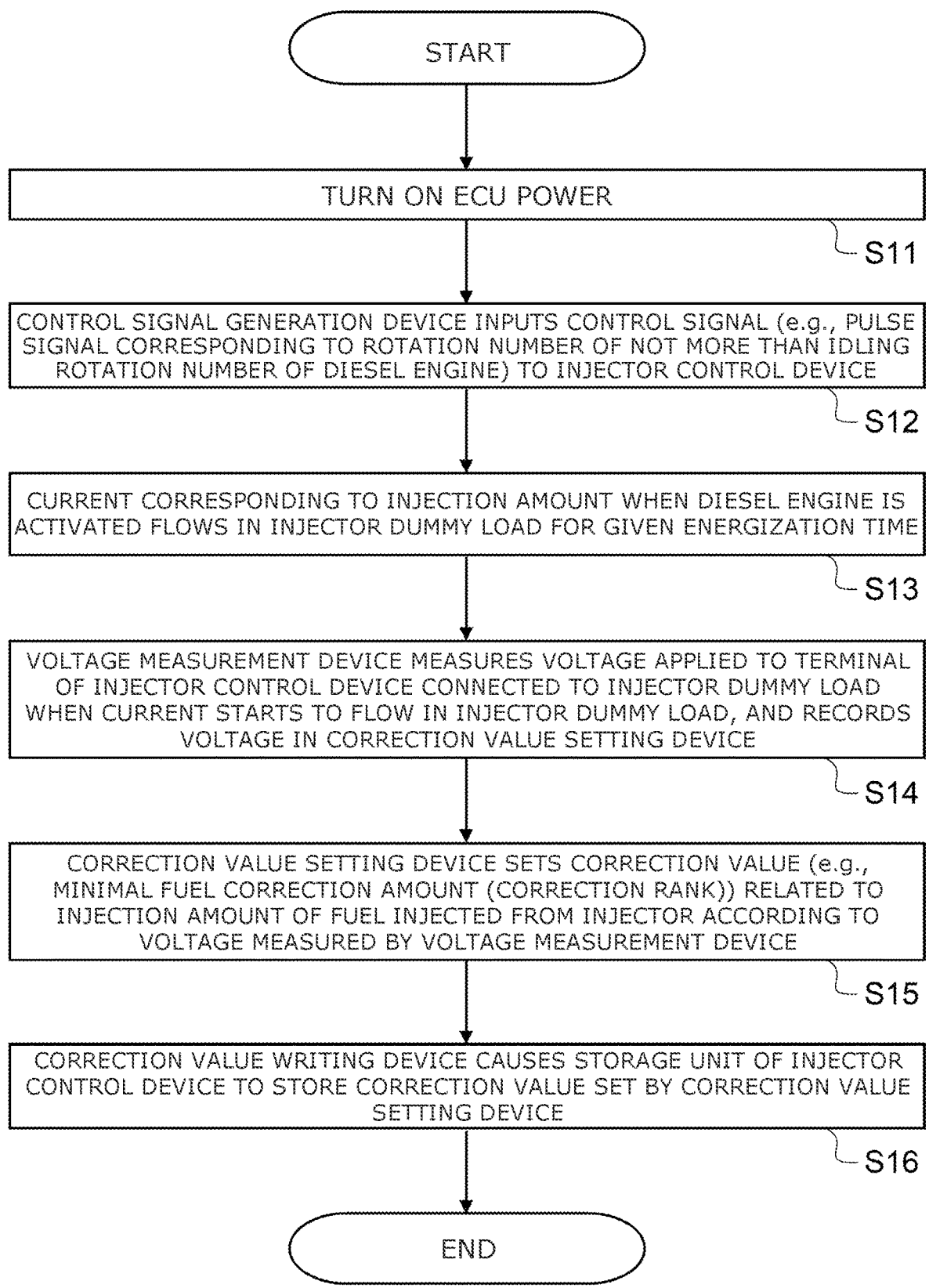
FIG. 6 is a flow chart illustrating a diesel engine manufacturing method according to a first embodiment of the present invention.

FIG. 6 is a flow chart illustrating a diesel engine manufacturing method according to a first embodiment of the present invention.

First, in Step S11, the ECU power source 111 (see FIG. 1) is set in an ON state. As a result, an operation of the ECU including the injector control device 2 is started. Subsequently, in Step S12, the control signal generation device 11 generates a control signal which controls the injector control device 2 and inputs the control signal to the injector control device 2. For example, the control signal in the present embodiment is a pulse signal corresponding to a rotation number of not more than the idling rotation number of the diesel engine 30. The rotation number of not more than the idling rotation number of the diesel engine 30 is, e.g., about 500 rpm, which is the rotation number simulating the rotation number of the diesel engine 30 when the diesel engine 30 is activated (e.g., during cranking). The step in Step S12 in the present embodiment is an example of a "signal inputting step" in the present invention.

Subsequently, when the control signal is input from the control signal generation device 11 to the injector control device 2, in Step S13, a current corresponding to an injection amount when the diesel engine 30 is activated flows in the injector dummy load 12 for a given energization time.

Subsequently, in Step S14, the voltage measurement device 13 measures the voltage applied to the terminal 26 of the injector control device 2 connected to the injector dummy load 12 when a current corresponding to the injection amount at the activation of the diesel engine 30 starts to flow in the injector dummy load 12, and records the voltage in the correction value setting device 14. The step in Step S14 in the present embodiment is an example of a "voltage measurement step" in the present invention.

Subsequently, in Step S15, the correction value setting device 14 sets a correction value related to an injection amount of the fuel injected from the injector 4 according to the voltage measured by the voltage measurement device 13. The correction value related to the injection amount of the fuel is, e.g., a correction value (correction rank) of a minimal fuel, which is a correction value related to an energization time for the injector 4 when, e.g., minimal fuel injection is to be performed. The step in Step S15 in the present embodiment is an example of a "correction value setting step" in the present invention.

As described previously with reference to FIGS. 4 and 5, in the diesel engine 30 in which the direct-acting injector 4 is mounted, there is a correlation between the drive voltage for the injector 4 and the fuel injection amount of the injector 4. When the drive voltage for the injector 4 is relatively high, the fuel injection amount of the injector 4 relatively increases. Accordingly, when the voltage measured by the voltage measurement device 13 is relatively high, the correction value setting device 14 sets a correction value which relatively shortens the energization time for the injector 4 and relatively reduces the injection amount of the fuel injected from the injector 4. Meanwhile, when the drive voltage for the injector 4 is relatively low, the fuel injection amount of the injector 4 relatively decreases. Accordingly, when the voltage measured by the voltage measurement device 13 is relatively low, the correction value setting device 14 sets a correction value which relatively elongates the energization time for the injector 4 and relatively increases the injection amount of the fuel injected from the injector 4.

The correction value setting device 14 may also calculate, as the correction value, an absolute value of the energization time for the injector 4. Alternatively, the correction value setting device 14 may also calculate, as the correction value, a ratio coefficient with respect to a reference value (typ) of the energization time for the injector 4.

Subsequently, in Step S16, the correction value writing device 15 causes the storage unit 25 of the injector control device 2 to store the correction value set by the correction value setting device 14. The step in Step S16 in the present embodiment is an example of a "correction value writing step" in the present invention.

According to the diesel engine manufacturing method according to the present embodiment, the same effects as those of the diesel engine injection-amount correction system 10 and the diesel engine 30 each described previously with reference to FIGS. 4 and 5 can be obtained.

According also to the diesel engine manufacturing method according to the present embodiment, in Step S12, a pulse signal corresponding to a rotation number of not more than the idling rotation number is input as the control signal to the injector control device 2. Consequently, a drive current for the injector 4 simulating the injector drive current when, e.g., the diesel engine 30 is activated (e.g., during cranking) flows in the injector dummy load 12 connected to the injector control device 2. As a result, the correction value is set according to an initial voltage at the terminal 26 of the injector control device 2 when a minimal fuel that is smallest in amount during the operation of the diesel engine 30 is injected. This allows the diesel engine manufacturing method according to the present embodiment to more reliably ensure accuracy required of a minimal fuel injection amount and more reliably inhibit the minimal fuel injection from disappearing.

Figure 7:
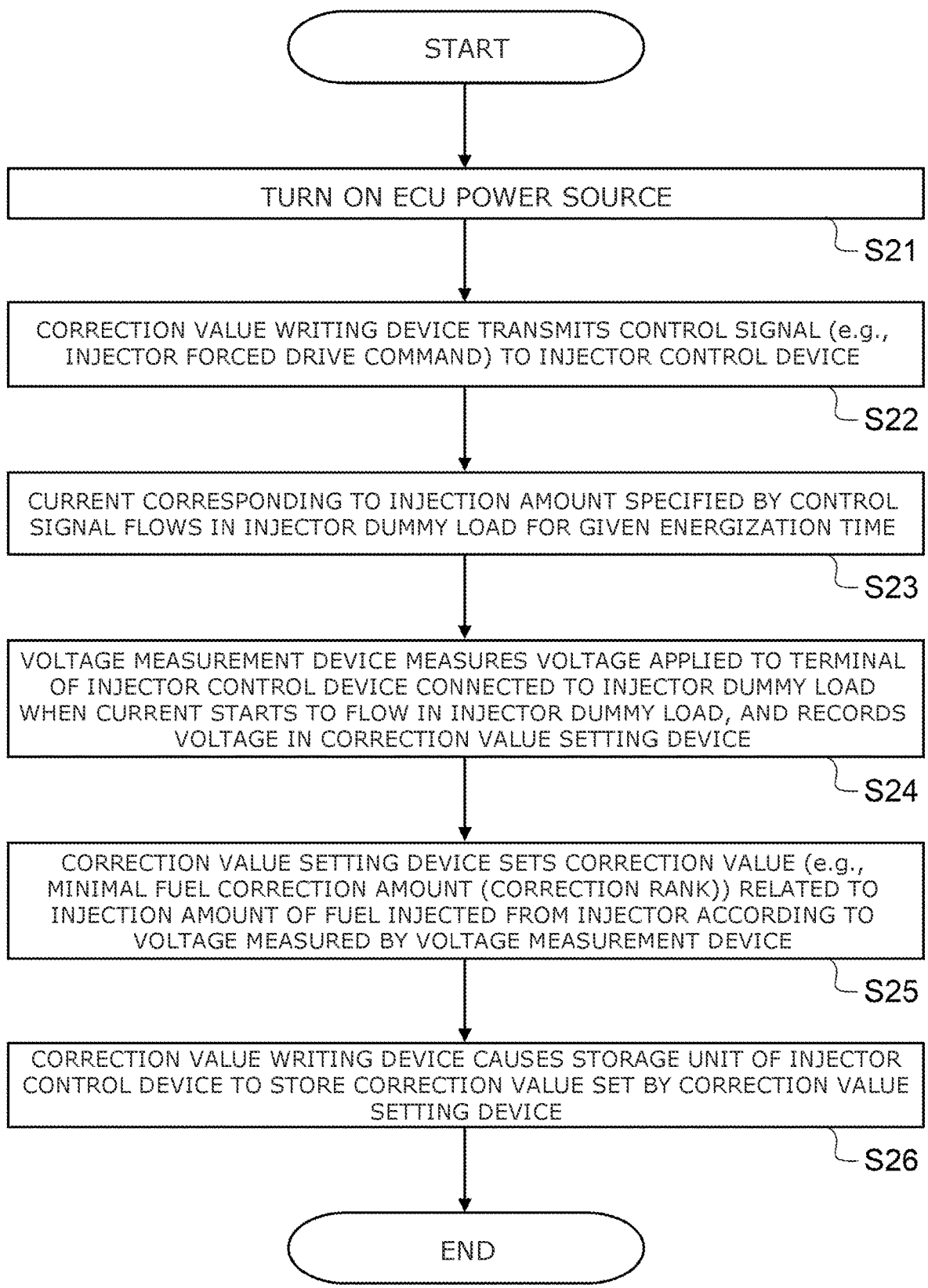
FIG. 7 is a flow chart illustrating a diesel engine manufacturing method according to a second embodiment of the present invention.

FIG. 7 is a flow chart illustrating a diesel engine manufacturing method according to a second embodiment of the present invention.

Note that, when steps of the diesel engine manufacturing method according to the second embodiment are the same as the steps of the diesel engine manufacturing method according to the first embodiment described previously with reference to FIG. 6, a repetitive description is omitted appropriately, and differences will be mainly described below.

First, the step in Step S21 is the same as the step in Step S11 described previously with reference to FIG. 6.

Subsequently, in Step S22, the correction value writing device 15 transmits a control signal to the injector control device 2. For example, the control signal in the present embodiment is a signal related to an injector forced drive command which forcibly drives the injector dummy load 12. Thus, the control signal input to the injector control device 2 may be not only the pulse signal related to the rotation number of the diesel engine 30, but also the signal that forcibly drives the injector dummy load 12. The step in Step S22 in the present embodiment is an example of the "signal inputting step" in the present invention.

Subsequently, in Step S23, a current corresponding to an injection amount specified by the control signal input from the correction value writing device 15 to the injector control device 2 flows in the injector dummy load 12 for a given energization time.

Subsequently, the step in Step S24 is the same as the step in Step S14 described previously with reference to FIG. 6. In other words, the step in Step S24 in the present embodiment is an example of the "voltage measurement step" in the present invention.

Subsequently, the step in Step S25 is the same as the step in Step S15 described previously with reference to FIG. 6. In other words, the step in Step S25 in the present embodiment is an example of the "correction value setting step" in the present invention.

Subsequently, the step in Step S26 is the same as the step in Step S16 described previously with reference to FIG. 6. In other words, the step in Step S26 in the present embodiment is an example of the "correction value writing step" in the present invention.

According to the diesel engine manufacturing method according to the present embodiment, the same effect as the effects of the diesel engine manufacturing method described previously with reference to FIG. 6 can be obtained.

The description has been given heretofore of the embodiments of the present invention. However, the present invention is not limited to the embodiments described above, and can variously be modified within a scope not departing from the claims. In a configuration of each of the embodiments described above, a part thereof can be omitted or optionally be combined to be different from the configuration described above.

REFERENCE SIGNS LIST

2 Injector control device
3 Engine operation information
4 Injector
10 Injection-amount correction system
11 Control signal generation device
12 Injector dummy load
13 Voltage measurement device
14 Correction value setting device
15 Correction value writing device
21 MICOM
22 Charge voltage control circuit
24 Injector control circuit
25 Storage unit
26 Terminal
30 Diesel engine
41 Solenoid
42 Needle valve
43 Sheet portion
44 Return spring
46 Fuel
111 ECU power source
112 Relay
113 AC-DC power source
114 Dummy load
141 CAN board
431 Nozzle hole

The invention claimed is:

1. A diesel engine comprising:
an injector that uses a solenoid to directly drive a needle valve and inject a fuel; and
an injector control device that controls the driving by the injector,
the injector control device including:
a charge voltage control circuit that stores an electric energy in a capacitor on the basis of a voltage supplied from a battery;
a storage unit that stores a correction value related to an injection amount of the fuel injected from the injector; and
an injector control circuit that controls the driving by the injector on the basis of each of a voltage supplied from the charge voltage control circuit and the correction value stored in the storage unit,
the correction value being set according to a voltage applied to a terminal of the injector control device connected to a load when a current starts to flow in the load connected to the injector control device, wherein
the voltage applied to the terminal is measured by a voltage measurement device in a production process, and
the correction value is set according to the voltage measured by the voltage measurement device and stored in the storage unit in the production process.

2. The diesel engine according to claim 1, wherein the injector control circuit controls the driving by the injector on the basis of the correction value when the injection amount is not more than a predetermined amount.

3. The diesel engine according to claim 1, wherein the current flows in the load as a result of inputting of a pulse signal corresponding to a rotation number of not more than an idling rotation number to the injector control device.

4. The diesel engine according to claim 1, wherein the load is an injector dummy load having a coil and a resistor and simulating the injector.

5. A diesel engine manufacturing method, which is a method of manufacturing a diesel engine including an injector that uses a solenoid to directly drive a needle valve and inject a fuel and an injector control device that controls the driving by the injector, the diesel engine manufacturing method comprising:
a signal inputting step of inputting a control signal to the injector control device;
a voltage measurement step of measuring a voltage applied to a terminal of the injector control device connected to a load when a current starts to flow in the load connected to the injector control device due to the signal inputting step;
a correction value setting step of setting a correction value related to an injection amount of the fuel injected from the injector according to the voltage measured by the voltage measurement step; and
a correction value writing step of causing a storage unit of the injector control device to store the correction value set by the correction value setting step.

6. The diesel engine manufacturing method according to claim 5, wherein the signal inputting step, the voltage measurement step, the correction value setting step, and the correction value writing step are performed in a production process of the diesel engine.

7. The diesel engine manufacturing method according to claim 5, wherein the control signal is a pulse signal corresponding to a rotation number of not more than an idling rotation number of the diesel engine.

8. The diesel engine manufacturing method according to claim 5, wherein the load is an injector dummy load having a coil and a resistor and simulating the injector.

9. A diesel engine injection-amount correction system comprising:
an injector control device that controls driving by an injector that uses a solenoid to directly drive a needle valve and inject a fuel;
a control signal generation device that generates a control signal which controls the injector control device and inputs the control signal to the injector control device;
a load connected to the injector control device;
a voltage measurement device that measures a voltage applied to a terminal of the injector control device connected to the load when a current starts to flow in the load due to the control signal;
a correction value setting device that sets a correction value related to an injection amount of the fuel injected from the injector according to the voltage measured by the voltage measurement device; and
a correction value writing device that causes a storage unit of the injector control device to store the correction value set by the correction value setting device wherein
the control signal generation device inputs the control signal to the injector control device in a production process of a diesel engine in which the injector is to be mounted,
the voltage measurement device measures the voltage applied to the terminal of the injector control device in the production process of the diesel engine,
the correction value setting device sets the correction value in the production process of the diesel engine, and the correction value writing device stores the correction value in the storage unit in the production process of the diesel engine.

10. The diesel engine injection-amount correction system according to claim 9, wherein the control signal is a pulse signal corresponding to a rotation number of not more than an idling rotation number of the diesel engine.

11. The diesel engine injection-amount correction system according to claim 9, wherein the load is an injector dummy load having a coil and a resistor and simulating the injector.

* * * * *